United States Patent [19]

Chong et al.

[11] Patent Number: 4,569,814

[45] Date of Patent: Feb. 11, 1986

[54] PREFORMING OF PREHEATED PLASTIC PELLETS FOR USE IN TRANSFER MOLDING

[75] Inventors: T. S. Chong; F. C. Chong, both of Taman Marida; C. K. Ng, Taman Yoon Fook; T. T. Lim, Seremban Garden, all of Malaysia

[73] Assignee: Motorola, Inc., Schaumburg, Ill.

[21] Appl. No.: 628,018

[22] Filed: Jul. 3, 1984

[51] Int. Cl.4 .............................................. B29C 45/14
[52] U.S. Cl. ..................................... 264/279; 264/26;
264/272.14; 264/272.15; 264/272.17;
264/328.5; 264/328.17; 264/322; 264/325
[58] Field of Search ................ 264/26, 272.14, 272.15,
264/272.17, 279, 279.1, 328.4, 328.5, 328.17,
322, 325; 425/544, 352

[56] References Cited

U.S. PATENT DOCUMENTS

| | | | |
|---|---|---|---|
| 3,473,196 | 10/1969 | Hull et al. | 264/328.5 X |
| 4,374,795 | 2/1983 | Keilp et al. | 264/328.17 X |
| 4,480,975 | 11/1984 | Plummer et al. | 264/272.17 X |

*Primary Examiner*—Jan Silbaugh
*Attorney, Agent, or Firm*—Vincent B. Ingrassia

[57] ABSTRACT

Prior to supplying plastic encapsulant to the reservoir of a mold for the purpose of encapsulating semiconductor devices, pellets of the encapsulant are heated until they become soft. An operator then places the pellets into a preforming chamber where they are compressed to form a softened charge of encapsulant. This charge is then removed from the chamber and placed into the reservoir of the mold.

2 Claims, 12 Drawing Figures

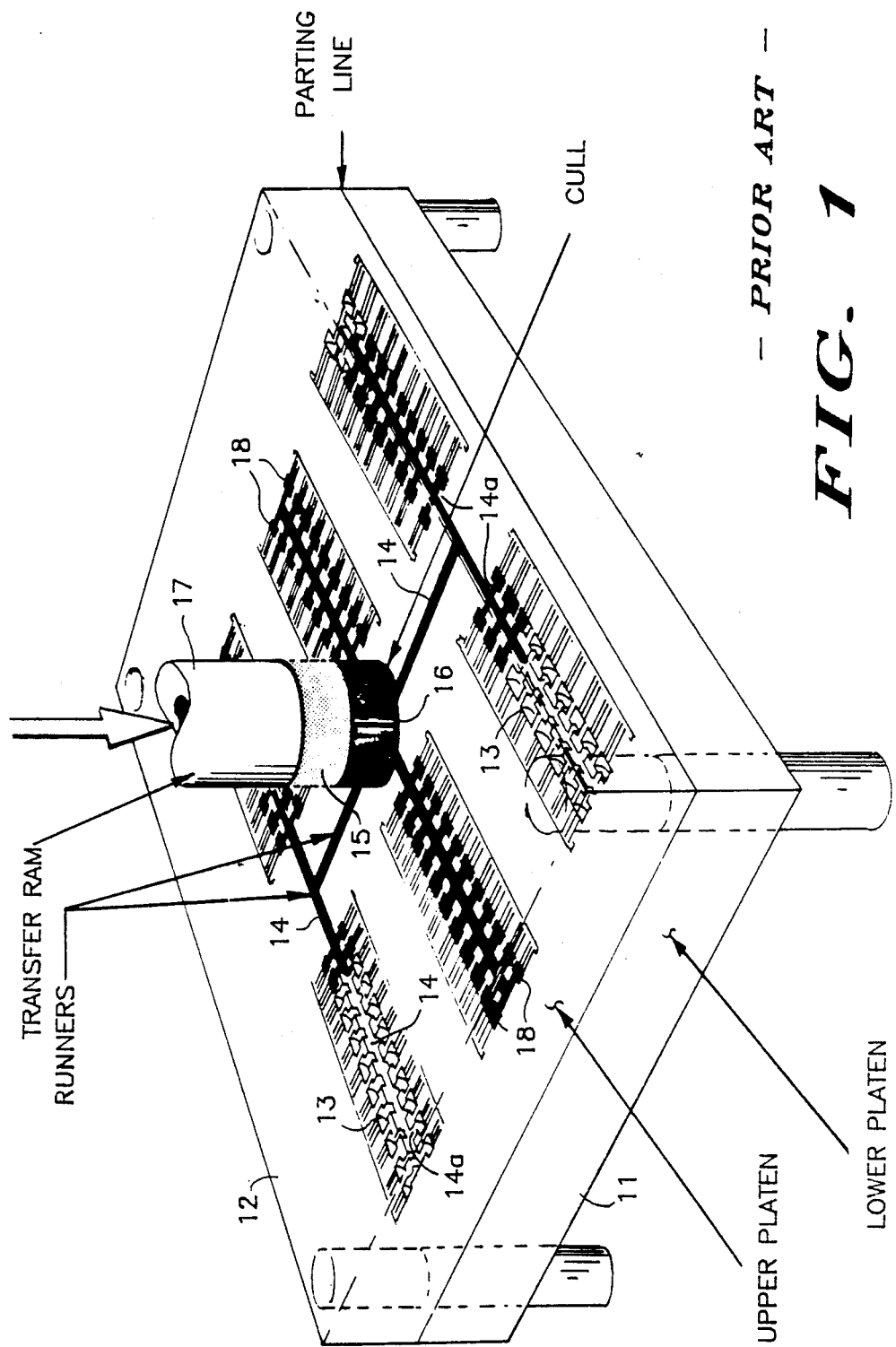
FIG. 1  — PRIOR ART —

PREFORMING OF PREHEATED PLASTIC PELLETS FOR USE IN TRANSFER MOLDING

BACKGROUND OF THE INVENTION

This invention relates generally to improved techniques for encapsulating objects such as electronic devices and components and, more particularly, to an improved method for the plastic encapsulation of semiconductor devices.

Plastic encapsulation of semiconductor devices by transfer molding is a well known and much used technique. In a typical situation, a large number of components or devices are placed in an open multi-cavity mold with one or more devices in each cavity. For manufacturing convenience, the devices are often coupled together on ladder-like lead frames or tapes. When the mold is closed, the two mold portions sealed against the lead frames are taped to prevent the leads from being covered with plastic. The many cavities in the mold are connected by a tree like array of channels (runners) to a central reservoir (pot) from which the plastic is fed. Typically, preheated plastic pellets are placed in the central reservoir (pot) and compressed by a ram or piston. The combination of heat and pressure causes the plastic to flow through the runner-tree into the individual mold cavities where it subsequently hardens.

Typically the plastic pellets are preheated in a radio frequency preheater until they become soft. Next, several of the preheated pellets are manually compressed causing them to stick together, and the group is manually lifted off the preheater and inserted into the reservoir or pot.

Unfortunately, to this point there has been no standardization of pellets and pot sizes. Due to this nonstandardization and due to the manual loading procedure of preheated pellets, air gets trapped in the compound during the initial stage of molding as a result of the RAM compressing the pellets. This trapped air eventually flows into the mold cavities with the plastic, is further compressed by the final mode compression and may show up as voids (defects which open to the surface), bubbles (normally invisible from the surface), and/or blisters (bubbles so close to the surface that they cause surface irregularities) in the molded semiconductor packages.

Thus, a need exists for an improved molding procedure and method for handling the plastic pellets so as to reduce the number of voids, bubbles and/or blisters which appear in the molded semiconductor package.

SUMMARY OF THE INVENTION

It is an object of the present invention to provide an improved method for the plastic encapsulation of semiconductor or other electronic devices.

It is a further object of the present invention to provide an improved method for handling and transporting preheated plastic pellets to the injection system of a mold.

It is a still further object of the present invention to provide means for substantially reducing distortions and irregularities in preheated plastic pellets which are due to manual transportation of the softened pellets to the injection system of a mold and to the variations in pellet and pot sizes.

According to a first aspect of the invention there is provided a method for encapsulating objects, comprising providing a mold having at least one mold cavity therein for receiving and containing the objects. This cavity communicates with a reservoir of encapsulant. The objects are placed in the cavity. A plurality of pellets of encapsulants are heated and then preformed to form a charge of softened encapsulant. This charge is then dropped into the reservoir, and the softened encapsulant is forced from the reservoir to the cavity.

According to a further aspect of the invention there is provided a method of providing a charge of softened encapsulant for use in a transfer mold, comprising placing a plurality of heated pellets of encapsulant in a preforming chamber and compressing said plurality of heated pellets to form said charge.

The above and other objects, features and advantages of the present invention will be more clearly understood from the following detailed description taken in conjunction with the accompanying drawings, in which:

BRIEF DESCRIPTION OF THE DRAWINGS

FIG. 1 illustrates a transfer mold for encapsulating multiple electronic components in accordance with the prior art;

DESCRIPTION OF THE PREFERRED EMBODIMENT

Figure 2A:
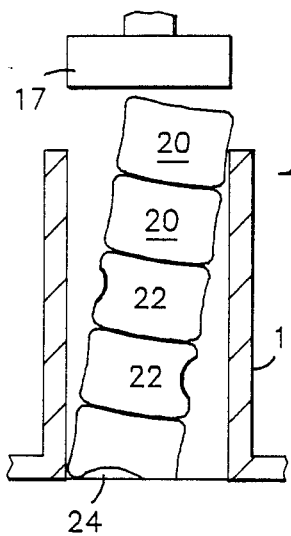
FIGS. 2A, 2B, 3A, 3B, 4A, and 4B illustrate how compression of softened pellets in accordance with prior art techniques result in trapped air which then flows into the mold cavities.

FIG. 1 illustrates a prior art transfer mold for plastic encapsulation of electronic devices comprising separable lower platten 11 and upper platten 12 in which are formed mold cavities 13 adapted to contain encapsulated devices, a tree like pattern of runners 14 and a central plastic reservoir or pot 15. Hot plastic 16 in a form of preheated pellets is placed in pot 15 and compressed by moveable ram 17 causing plastic 16 to flow through runners 14 into mold cavities 13 to form encapsulated devices 18.

Figure 2B:
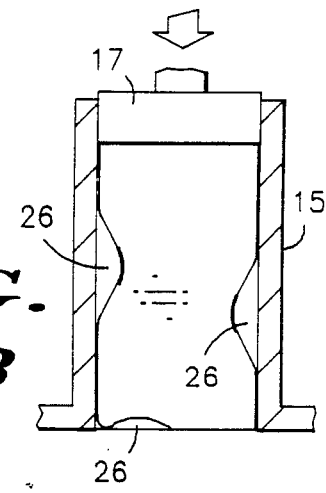
Figure 3A:
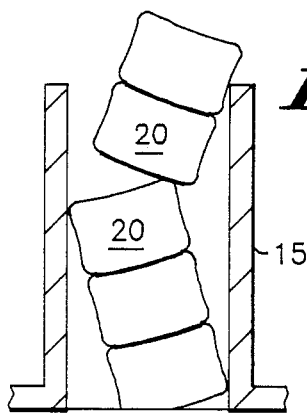
Figure 3B:
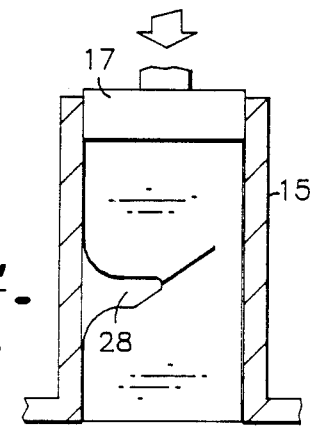
Figure 4A:
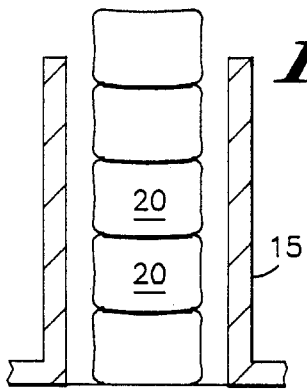
Figure 4B:
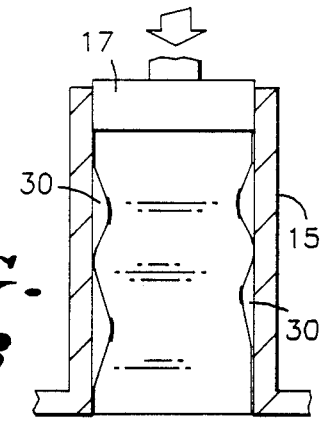

FIGS. 2A and 2B illustrate how air can be trapped in the pot as a result of manual handling of the softened pellets 20. During manual transportation of the softened pellets to pot 15, indentations 22 caused by fingers and a thumb indentation 24 will result in air being trapped such as is shown at 26 in FIG. 2B when the pellets are compressed by ram 17. FIG. 3A and 3B illustrate how pellet separation in pot 15 will result in air being trapped at 28. Finally, FIG. 4A and 4B illustrate how due to the difference in pot size and pellet size, air is trapped at regions 30 as shown in FIG. 4B.

Figure 5A:
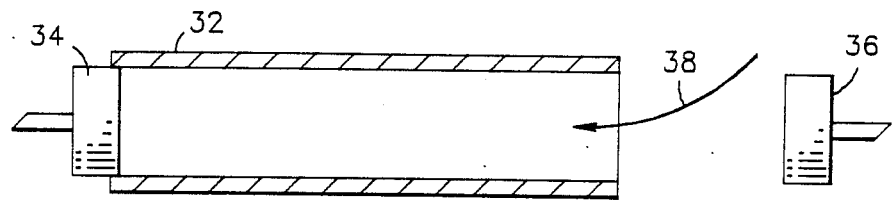
FIGS. 5A–5E illustrate how plastic pellets may be preformed prior to transportation to the pot of a transfer mold so as to prevent trapped air from flowing into the mold cavities.

FIGS. 5A through 5E illustrate a technique which substantially eliminates the problems associated with air being trapped in the mold pot and subsequently transmitted to the mold cavity resulting in defective devices. FIG. 5A is a cross-sectional view of a cylindrical tube-like preforming chamber or structure 32 having an inner diameter which is slightly larger than the outer diameter of reciprocating pistons 34 and 36. The mechanisms for causing pistons 34 and 36 to reciprocate in a manner to be described hereinbelow are considered to be well known to those skilled in the art.

Figure 5B:
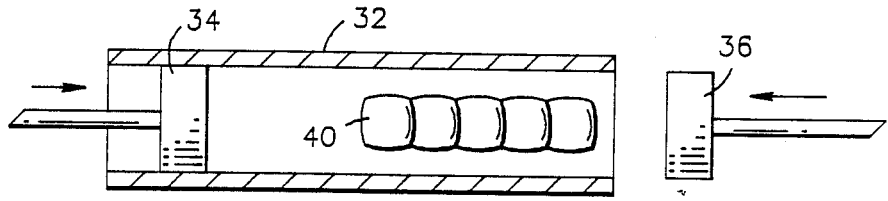
Figure 5C:
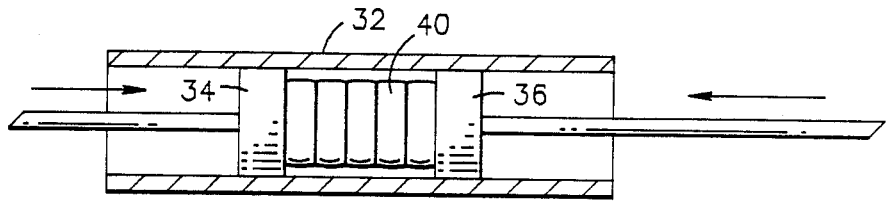
Figure 5D:
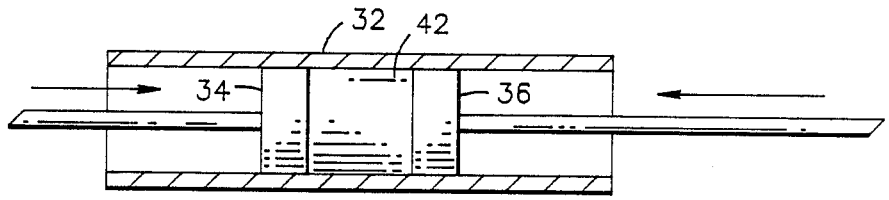
Figure 5E:
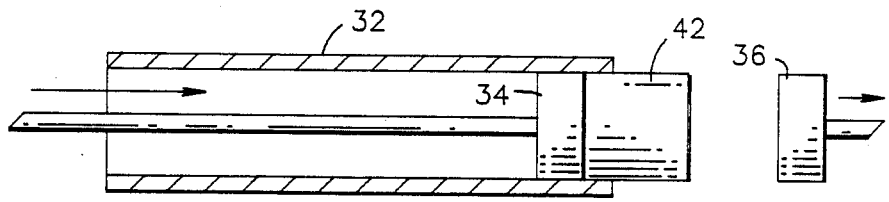

Initially, piston 36 is far removed from the right hand portion of tube 32 so as to permit softened plastic pellets to be inserted into the tube as indicated by arrow 38. Pellets 40 are softened by preheating prior to insertion into tube 32. After insertion of the pellets into tube 32, piston 34 is caused to move to the right towards pellets 40, and piston 36 is caused to move towards the left. This situation is shown in FIG. 5B. When pistons 34 and 36 engage opposite ends of pellets 40, pellets 40 will begin to become compressed as is shown in FIG. 5C until a single compressed plastic charge 42 is formed as is shown in FIG. 5D. Air is forced out of tube 32 through the space between pistons 34 and 36 and the inner wall of tube 32. Finally, both pistons 34 and 36 are caused to move to the left thus permitting charge 42 to be retrieved from tube 32 and placed in the mold pot.

Since the charge is now compressed, it is less susceptible to deformation by manual handling, and the pellets will not separate in the mold pot. Of course, care should still be taken to assure that the inner diameter of the pot is not substantially larger than the outer diameter of the charge.

The above description is given by way of example only. Changes in form and details may be made by one skilled in the art without departing from the scope of the invention.

We claim:
1. A method for encapsulating objects, comprising:
   providing a mold having at least one mold cavity therein for receiving and containing said objects, said at least one cavity communicating with a reservoir of encapsulant;
   placing said objects in said at least one cavity; heating a plurality of pellets of encapsulant to soften said pellets;
   placing the softened pellets in a preforming chamber having dimensions for receiving said pellets, said chamber having first and second open ends;
   compressing the plurality of heated pellets of encapsulant from said first and second ends to form a charge of softened encapsulant while at the same time permitting air to escape from said chamber to avoid entrapping air in said charge;
   dropping said charge into said reservoir; and forcing the softened encapsulant from said reservoir to said at least one cavity.
2. A method according to claim 1 wherein said encapsulant is plastic.

* * * * *